(12) United States Patent
Inoue et al.

(10) Patent No.: US 9,527,764 B2
(45) Date of Patent: Dec. 27, 2016

(54) QUARTZ GLASS MANUFACTURING METHOD USING HYDROGEN OBTAINED BY VAPORIZING LIQUID HYDROGEN

(71) Applicant: Shin-Etsu Chemical Co., Ltd., Tokyo (JP)

(72) Inventors: Dai Inoue, Ibaraki (JP); Takaaki Nagao, Ibaraki (JP); Hiroyuki Koide, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 33 days.

(21) Appl. No.: 14/280,691

(22) Filed: May 19, 2014

(65) Prior Publication Data

US 2014/0283557 A1    Sep. 25, 2014

Related U.S. Application Data

(62) Division of application No. 12/504,414, filed on Jul. 16, 2009, now abandoned.

(30) Foreign Application Priority Data

Jul. 18, 2008    (JP) .................................. 2008-187924

(51) Int. Cl.
*C03B 37/014* (2006.01)

(52) U.S. Cl.
CPC ..... *C03B 37/01413* (2013.01); *C03B 37/0142* (2013.01); *C03B 2201/02* (2013.01);
(Continued)

(58) Field of Classification Search
CPC ..................... C03B 37/01413; C03B 37/0142; C03B 37/14; C03B 2207/70; C03B 2207/85; C03B 2207/87; C03B 2207/36
See application file for complete search history.

(56) References Cited

U.S. PATENT DOCUMENTS

| 4,729,779 A | 3/1988 | De Vasselot |
| 6,725,690 B2 * | 4/2004 | Enomoto et al. ............... 65/414 |

(Continued)

FOREIGN PATENT DOCUMENTS

| CN | 86202877 U | 4/1987 |
| CN | 1509984 A | 7/2004 |

(Continued)

OTHER PUBLICATIONS

Prosecution history of parent U.S. Appl. No. 12/504,414, filed Jul. 16, 2009.

(Continued)

*Primary Examiner* — Queenie Dehghan (57) ABSTRACT

Provided is a quartz glass manufacturing method that involves using one or more burners, supplying hydrogen and oxygen to the one or more burners to generate an oxyhydrogen flame, introducing a silicide into the oxyhydrogen flame, forming a porous base material by depositing silicon dioxide generated from a flame hydrolysis reaction with the silicide, and heating and sintering the porous base material to form transparent glass, the method comprising supplying hydrogen that is stored or made at a normal temperature to the one or more burners; controlling a hydrogen flow rate using a measurement apparatus or control apparatus that performs measurement based on heat capacity of a gas; vaporizing liquid hydrogen stored in a low-temperature storage chamber, and supplying the vaporized liquid hydrogen to the one or more burners as backup hydrogen; switching from the hydrogen to the backup hydrogen; and when switching, adjusting the hydrogen flow rate to a value obtained by multiplying the hydrogen flow rate immediately after switching by a predetermined correction coefficient.

7 Claims, 9 Drawing Sheets

(52) U.S. Cl.
    CPC ...... *C03B 2201/31* (2013.01); *C03B 2207/36* (2013.01); *C03B 2207/70* (2013.01); *C03B 2207/85* (2013.01); *C03B 2207/87* (2013.01); *Y02P 40/57* (2015.11)

(56) References Cited

U.S. PATENT DOCUMENTS

| | | | |
|---|---|---|---|
| 7,805,981 B2 * | 10/2010 | Kadlecek et al. | ........... 73/24.06 |
| 2004/0030522 A1 | 2/2004 | Tison | |
| 2005/0109066 A1 | 5/2005 | Dabby | |

FOREIGN PATENT DOCUMENTS

| | | |
|---|---|---|
| EP | 2221280 A2 | 8/2010 |
| JP | H01-239033 A | 9/1989 |
| JP | H03-242341 A | 10/1991 |
| JP | 2005-343714 A | 12/2005 |
| JP | 2006-009917 A | 1/2006 |

OTHER PUBLICATIONS

European Search Report for counterpart European Patent Application No. 09165709.8, issued by the European Patent Office on Feb. 14, 2012.

First Office Action for counterpart Application No. 200910165031.1, issued by the State Intellectual Property office of China on Sep. 20, 2012.

"Brooks Model 5850E Installation and Operation Manual," DS-TMF-5850E-MFC-eng, Part No. 541B102AAG, Sep. 2009: see especially Paragraph 3-4 Calibrationand Paragraph 4-5 "Gas Conversion Factors".

* cited by examiner

H₂,O₂,N₂,SiCl₄, etc.

FIG.8

QUARTZ GLASS MANUFACTURING METHOD USING HYDROGEN OBTAINED BY VAPORIZING LIQUID HYDROGEN

CROSS REFERENCE TO RELATED APPLICATION

The present application is a divisional application of application Ser. No. 12/504,414, filed Jul. 16, 2009, which claims priority to Japanese Patent Application No. 2008-187924, filed Jul. 18, 2008, both of whose entire contents are incorporated herein by reference.

BACKGROUND

1. Technical Field

The present invention relates to manufacturing of quartz glass, such as that used as an optical fiber base material, obtained by depositing silicon dioxide ($SiO_2$) generated by a flame hydrolysis reaction. In particular, the present invention relates to a quartz glass manufacturing method and a quartz glass manufacturing apparatus using, as backup, hydrogen obtained by vaporizing liquid hydrogen.

2. Related Art

Currently used hydrogen supply equipment stores liquid hydrogen in a low-temperature storage chamber, heats and vaporizes the liquid hydrogen, and supplies the resulting gas to a device connected at a later stage. For example, when manufacturing quartz glass with a high degree of purity, techniques such as VAD or OVD may be used. Both of these techniques involve (i) generating silicon dioxide ($SiO_2$) through a hydrolysis reaction achieved by supplying a silicide such as silicon tetrachloride ($SiCl_4$) to an oxyhydrogen flame fueled by supplying hydrogen and oxygen to a burner, (ii) depositing the silicon dioxide to form a porous base material, and (iii) heating the porous base material in an electric furnace to form transparent quartz glass with a high degree of purity.

Manufacturing quartz glass using the VAD technique involves forming the porous base material by simultaneously rotating $SiO_2$, generated by a flame hydrolysis reaction, and depositing the $SiO_2$ on a starting material that can be lifted. During deposition, the position of the deposition tip of the porous base material is detected and the lifting speed is adjusted as the base material grows. As shown in Japanese Patent Application Publication No. 1-239033, however, when the lifting speed is held constant during deposition, it is necessary to detect the a deviation from the set value of the lifting speed at predetermined times and to correct the flow rate of the raw material gas such as $SiCl_4$ according to the detected deviation, in order to obtain stable optical fiber base material with the desired refractive index distribution. In Japanese Patent Application Publication No. 3-242341, in order to maintain a constant lifting speed, the flow rate of the hydrogen supplied to clad burners adjacent to a core burner, from among a plurality of clad burners, is controlled.

Manufacturing quartz glass using the OVD technique involves forming the porous base material by rotating the starting material and moving the deposition burner back and forth along the starting material to deposit silicon dioxide around the starting material.

The porous base material formed in this way is then heated to about 1500 degrees Celsius in a heating furnace, resulting in transparent quartz glass. At this time, the inside of the furnace is often a helium atmosphere in order to decrease residual air bubbles in the glass. If necessary, a dehydration process is performed by heating the porous base material in an atmosphere containing chlorine at a temperature between 1000 and 1200 degrees Celsius, before being changed into the transparent glass.

When the VAD technique is used to manufacture a quartz glass optical fiber preform having a core with a high refractive index and cladding with a refractive index lower than that of the core, the core deposition burner is often supplied with germanium as the additive for increasing the refractive index of the quartz glass. The germanium is supplied as a compound, such as germanium tetrachloride ($GeCl_4$). Germanium tetrachloride undergoes hydrolysis in the oxyhydrogen flame to create $GeO_2$. $SiCl_4$ and $GeCl_4$ are liquid at a normal temperature, and are vaporized before being supplied using techniques such as bubbling with a carrier gas or heating to a temperature above the respective boiling points.

In manufacturing equipment using the VAD or OVD techniques, the flow rate of gas supplied to the burners is controlled by a thermal mass flow controller (MFC).

The hydrogen used here is made at a normal temperature or stored at a normal temperature. One idea involves heating and vaporizing liquid hydrogen stored in a low-temperature storage chamber to supply backup hydrogen when the supply of the above hydrogen is stopped.

In a VAD apparatus using hydrogen made at a normal temperature, when switching to hydrogen obtained by vaporizing liquid hydrogen due to a stoppage of the hydrogen supply, the lifting speed unintentionally increases by about 2%, which results in a thinner core diameter.

When the same hydrogen switching occurs in an OVD apparatus, the density of the porous base material decreases.

When the core diameter or the density of the base material changes in this way, it is impossible to achieve a stable optical fiber base material having the desired refractive index distribution, causing an increase in the chance of defects.

SUMMARY

Therefore, it is an object of an aspect of the innovations herein to provide a quartz glass manufacturing method and a quartz glass manufacturing apparatus, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary quartz glass manufacturing method may include a quartz glass manufacturing method that involves using one or more burners, supplying hydrogen and oxygen to the one or more burners to generate an oxyhydrogen flame, introducing a silicide into the oxyhydrogen flame, forming a porous base material by depositing silicon dioxide generated from a flame hydrolysis reaction with the silicide, and heating and sintering the porous base material to form transparent glass, the quartz glass manufacturing method comprising supplying hydrogen that is stored or made at a normal temperature to the one or more burners; controlling a hydrogen flow rate using a measurement apparatus or control apparatus that performs measurement based on heat capacity of a gas; vaporizing liquid hydrogen stored in a low-temperature storage chamber, and supplying the vaporized liquid hydrogen to the one or more burners as backup hydrogen; switching from the hydrogen to the backup hydrogen; and when switching, adjusting the hydrogen flow rate to a value obtained by multiplying the hydrogen flow rate immediately after switching by a predetermined correction coefficient.

According to a second aspect related to the innovations herein, one exemplary quartz glass manufacturing apparatus may include a quartz glass manufacturing apparatus that uses one or more burners, supplies hydrogen and oxygen to the one or more burners to generate a oxyhydrogen flame, introduces a silicide into the oxyhydrogen flame, forms a porous base material by depositing silicon dioxide generated from a flame hydrolysis reaction with the silicide, and heats and sintering the porous base material to form transparent glass, the quartz glass manufacturing apparatus comprising first hydrogen supply equipment that supplies hydrogen that is stored or made at a normal temperature to the one or more burners; second hydrogen supply equipment that includes at least a low-temperature storage chamber and a vaporizer, and that uses the vaporizer to vaporize liquid hydrogen stored in the low-temperature storage chamber to generate and supply backup hydrogen as a backup for the hydrogen that is stored or made at the normal temperature; a measurement apparatus or control apparatus that performs measurement based on heat capacity of a gas to control a hydrogen flow rate; and a correction apparatus that, when the switching to the backup hydrogen occurs, adjusts a set value of the hydrogen flow rate to a value obtained by multiplying the hydrogen flow rate immediately after switching by a predetermined correction coefficient.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

When a supply to a VAD apparatus using hydrogen made at room temperature is switched to hydrogen obtained by vaporizing liquid hydrogen, the lifting speed increases by about 2% and the core diameter becomes thinner. Upon inspection, this increase in lifting speed and thinning of the core corresponds to a change when the flow rate of the hydrogen was decreased by about 1% without changing the flow rate of the $SiCl_4$. The lifting speed is determined by the flow rate of hydrogen and $SiCl_4$ supplied to the core deposition burner, and the core diameter is determined by the flow rate of hydrogen supplied to the core deposition burner.

In an OVD apparatus as well, when the supply is switched to hydrogen obtained by vaporizing liquid hydrogen, a drop in the density of the base material corresponds with a change occurring when the flow rate of the hydrogen is decreased.

When supplying an MFC, the pressure and temperature of the hydrogen is held to be about the same before and after the switching of the hydrogen, and no difference is seen connecting a change in the flow rate of the hydrogen to the purity or impurity concentration of the liquid hydrogen and the hydrogen made at a normal temperature.

Therefore, the inventors focus on the presence of hydrogen molecule isomers.

Figure 1:
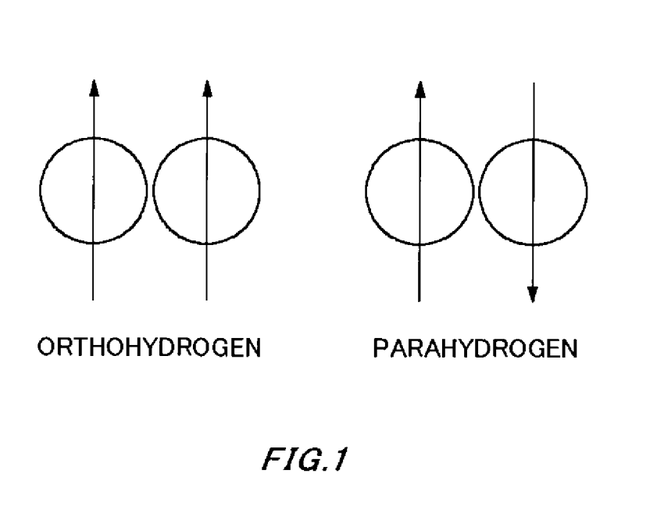
FIG. 1 is a schematic view showing the spin states of orthohydrogen and parahydrogen.

As shown schematically in FIG. 1, there are two types of hydrogen molecule isomers having different nuclear spin. Diatomic molecules such as hydrogen molecules have two protons. Hydrogen molecules in which these two protons have the same spin orientation are known as orthohydrogen, and hydrogen molecules in which these two protons have different spin orientation are known as parahydrogen.

Figure 2:
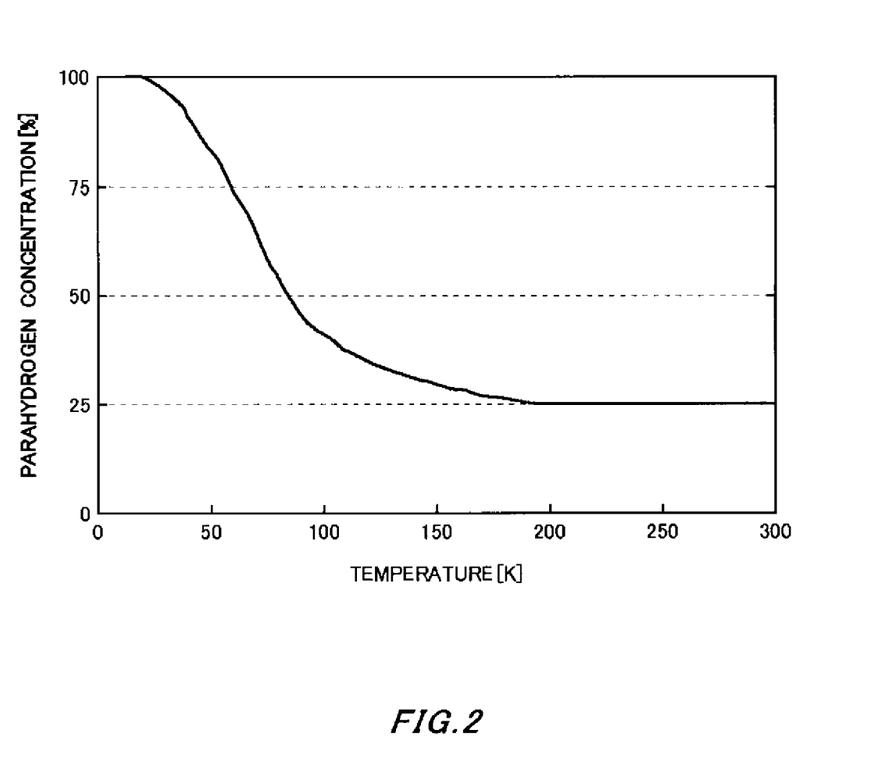
FIG. 2 shows the parahydrogen concentration in equilibrium at each temperature. The vertical axis is the parahydrogen concentration (%) and the horizontal axis is the temperature (K).

FIG. 2 shows parahydrogen concentration in equilibrium at each temperature. In equilibrium at temperatures above 200 K, the hydrogen includes orthohydrogen and parahydrogen at a ratio of 3 to 1, but in equilibrium near the boiling point of liquid hydrogen, which is 20 K, almost all of the hydrogen is parahydrogen. Hydrogen in which orthohydrogen and parahydrogen are in equilibrium at a normal temperature is referred to as normal hydrogen. The change from orthohydrogen to parahydrogen occurs gradually, and since this change is a thermal reaction, when the hydrogen at a normal temperature is used as the liquid hydrogen without changing the ratio between the orthohydrogen and the parahydrogen, the conversion from orthohydrogen to parahydrogen occurs in the low-temperature storage chamber and generates heat, so that a large amount of liquid hydrogen evaporates.

Usually, in order to prevent such a reaction and store the liquid hydrogen safely, a process of liquefying the hydrogen is used for the ortho-para conversion, such that almost all of the hydrogen becomes liquid parahydrogen, which can then be supplied or stored.

In the hydrogen obtained by vaporizing liquid hydrogen, a certain amount of the parahydrogen can be converted to orthohydrogen by contact with magnetic particles on an inner surface of a metallic tube, while waiting for this hydrogen to be supplied to equipment at later stages using hydrogen. However, by passing through a tube that is several hundred meters long, the resulting hydrogen will have a parahydrogen concentration higher than that of normal hydrogen.

Orthohydrogen and parahydrogen have different properties. The isobaric specific heat at 0 degrees Celsius is 30.35 [J/(mol·K)] for parahydrogen and 28.59 [J/(mol·K)] for normal hydrogen, which is a difference of about 6%.

On the other hand, a thermal MFC used to control the flow rate of the hydrogen performs this control by measuring the heat capacity of the liquid passing therethrough, and therefore can accurately control the flow rate by using a different conversion factor for liquids having different specific heat.

As a result, when an MFC using a thermal coefficient suitable for normal hydrogen controls the flow rate of hydrogen in which the concentration of parahydrogen is higher than that of normal hydrogen, it was found that the actual flow rate is between 0% and 6% less than normal hydrogen, according to the concentration of parahydrogen. For example, when the parahydrogen concentration was about 37%, the actual hydrogen flow rate was seen to be about 1% less than the flow rate of normal hydrogen.

This change of up to 6% in the actual flow rate of the hydrogen has an effect on the optical characteristics of the resulting manufactured article that increases the rate of defective articles.

Storing normal hydrogen as the liquid hydrogen has been considered, but this method involves applying a magnetic field to control the conversion from orthohydrogen to parahydrogen. To achieve this effect, a device must be provided to apply the same magnetic field to not only the low-temperature storage chamber attached to the liquid hydrogen manufacturing equipment, but also to a lorry used for transport and a low-temperature storage chamber attached to the hydrogen supply equipment. Providing such a device is not practical in terms of cost.

Next, an examination was made of the difference between the actual flow rate and control values in thermal MFCs provided to each piece of manufacturing equipment when the manufacturing equipment is supplied with hydrogen obtained by vaporizing liquid hydrogen. A Coriolis mass flow meter was used to measure the actual flow rate.

The results of this measurement showed that even if the total amount of hydrogen used is changed within a scope that can be used during operation, the flow rate measured by the thermal MFCs calibrated for normal hydrogen differed by −1±0.02% from the actual flow rate. This value was similar for each apparatus.

Therefore, in the present invention, a correction coefficient is set in advance for each flow rate so that, when switching from normal hydrogen to hydrogen obtained by vaporizing backup liquid hydrogen, the control value of the MFC increases the hydrogen flow rate by 1±0.02% for each apparatus. By multiplying (i) the hydrogen flow rate immediately after switching by (ii) the correction coefficients set as described above to control the hydrogen flow rate of the MFC after switching, the actual flow rate of the hydrogen supplied to the core deposition burner and a clad deposition burner can be held constant. The resulting optical fiber base material has stable optical characteristics in a longitudinal direction. This adjustment that accompanies the switching may be performed for each apparatus, or may be adapted to allow centralized control. Centralized control allows for simpler operation.

The $SiCl_4$ and $GeCl_4$ are desirably supplied after being heated to a temperature above their respective boiling points and directly vaporized. With this method, any raw material gas concentration can be accurately achieved. Another gas such as helium may be added to the supply such that the vaporized gas does not contract and re-liquefy while traveling to the burner. Another method for supplying the $SiCl_4$ and $GeCl_4$ involves bubbling with a carrier gas and vaporizing the $SiCl_4$ and $GeCl_4$. However, this is not a desirable method because the mixture of the carrier gas and raw material gas has a raw material gas concentration that varies at high pressure.

Figure 3:
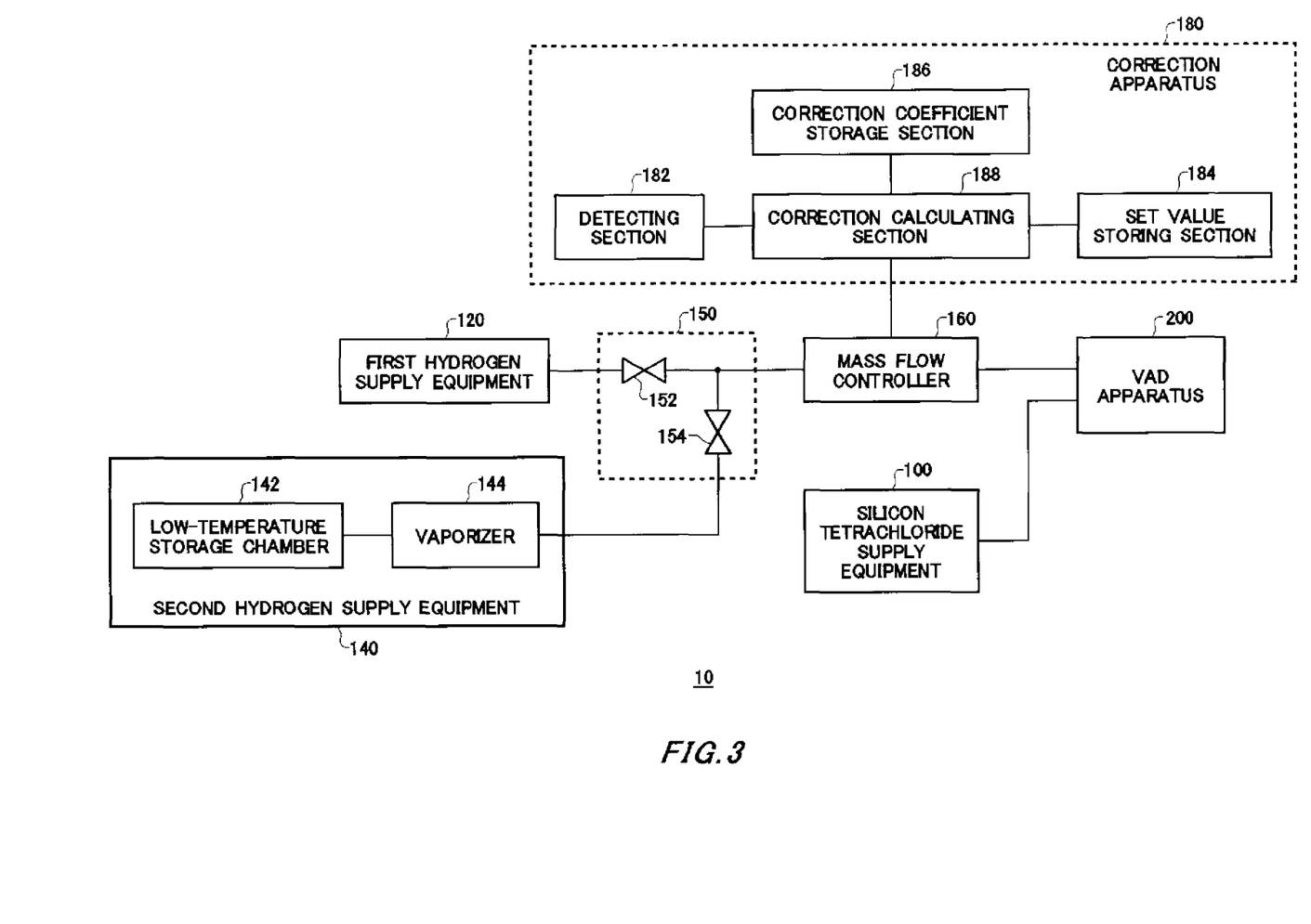
FIG. 3 shows an exemplary configuration of a quartz glass manufacturing apparatus 10 according to an embodiment of the present invention.

FIG. 3 shows an exemplary configuration of a quartz glass manufacturing apparatus 10 according to an embodiment of the present invention. The quartz glass manufacturing apparatus 10 is provided with silicon tetrachloride supply equipment 100, first hydrogen supply equipment 120, second hydrogen supply equipment 140, a hydrogen supply source switcher 150, a mass flow controller 160, a correction apparatus 180, and a VAD apparatus 200. An optical fiber base material manufacturing apparatus forms optical fiber base material through VAD by sequentially depositing fine glass particles on a tip of a starting material that is being lifted and rotated.

The silicon tetrachloride supply equipment 100 supplies the VAD apparatus 200 with silicon tetrachloride ($SiCl_4$). The first hydrogen supply equipment 120 supplies hydrogen made at a normal temperature or hydrogen stored at a normal temperature to a burner provided to the VAD apparatus 200. The second hydrogen supply equipment 140 is provided with the low-temperature storage chamber 142 and the vaporizer 144, uses the vaporizer 144 to vaporize the liquid hydrogen stored in the low-temperature storage chamber 142, and supplies the vaporized hydrogen to the burner provided to the VAD apparatus 200. The hydrogen supplied from the second hydrogen supply equipment 140 may be used as backup for the hydrogen supplied from the first hydrogen supply equipment 120.

The hydrogen supply source switcher 150 switches between the first hydrogen supply equipment 120 and the second hydrogen supply equipment 140 as the source supplying the hydrogen to the VAD apparatus 200. The hydrogen supply source switcher 150 may be provided with a first valve 152 disposed in the hydrogen supply line from the first hydrogen supply equipment 120 and a second valve 154 disposed in the hydrogen supply line from the second hydrogen supply equipment 140.

The mass flow controller 160 measures the flow rate of the hydrogen and controls the flow rate to be a set value. The mass flow controller 160 desirably performs this measurement based on the heat capacity of the gas.

The correction apparatus 180 includes a detecting section 182, a set value storage section 184, a correction coefficient storage section 186, and a correction calculating section 188. The correction apparatus 180 performs suitable corrections on the set value for the amount of hydrogen supplied to the VAD apparatus 200, and sets the corrected value in the mass flow controller 160. When switching the source of the hydrogen supply from the first hydrogen supply equipment 120 to the second hydrogen supply equipment 140, the correction apparatus 180 corrects the set value of the hydrogen flow rate to be equal to the product of the flow rate immediately after the switch and a predetermined correction coefficient.

The detecting section 182 detects the switch of the hydrogen supply source from the first hydrogen supply equipment 120 to the second hydrogen supply equipment 140. The detecting section 182 may detect the switching of the hydrogen source by observing which of the first valve 152 and the second valve 154 is open. Instead, the detecting section 182 may detect the switching of the hydrogen source by observing the ratio of orthohydrogen to parahydrogen in the hydrogen supplied to the mass flow controller 160.

The set value storage section 184 stores the set value of the hydrogen flow rate. The correction coefficient storage section 186 stores the correction coefficient used when correcting the flow rate of the hydrogen supplied to the VAD apparatus 200. When adjusting this hydrogen flow rate, the correction calculating section 188 multiplies the coefficient stored in the correction coefficient storage section 186 by the set value of the hydrogen flow rate stored in the set value storage section 184, and sets the result in the mass flow controller 160 as the corrected set value. When the hydrogen flow rate is not being corrected, the correction calculating section 188 may set the mass flow controller 160 to have the set value of the hydrogen flow rate stored in the set value storage section 184.

The VAD apparatus 200 is provided with the core deposition burner and the clad deposition burner, and deposits fine glass particles by causing a reaction between silicon tetrachloride and hydrogen supplied thereto.

The following describes specific embodiments of the inventions as examples, but the present invention is not limited to these embodiments.

First Embodiment

Figure 4:
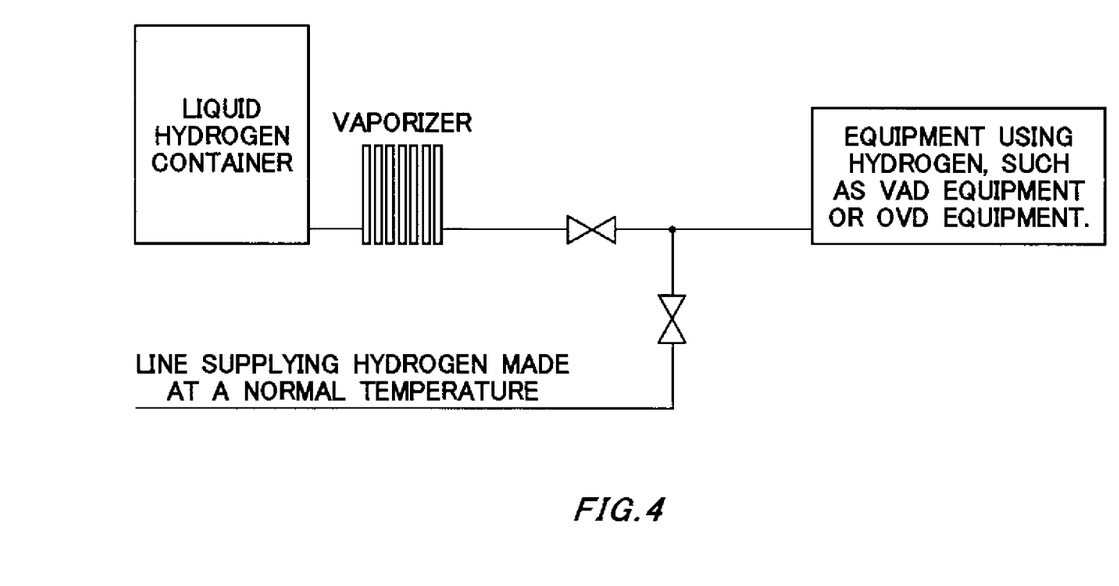
FIG. 4 is a schematic view showing the supply of hydrogen.

As shown schematically in FIG. 4, the liquid hydrogen that was developed and provided for commercial use was stored in a liquid hydrogen container. The liquid hydrogen was vaporized by a vaporizer and emitted as hydrogen gas at a stage beyond the hydrogen supply equipment to be mixed in a pipe with hydrogen made at a normal temperature (referred to hereinafter as "normal hydrogen") and supplied to equipment that uses hydrogen. The pipe of the liquid hydrogen supply line and the pipe of the normal hydrogen supply line are each provided with a valve immediately before the point where the pipes join, so that each line can be used independently.

Figure 5:
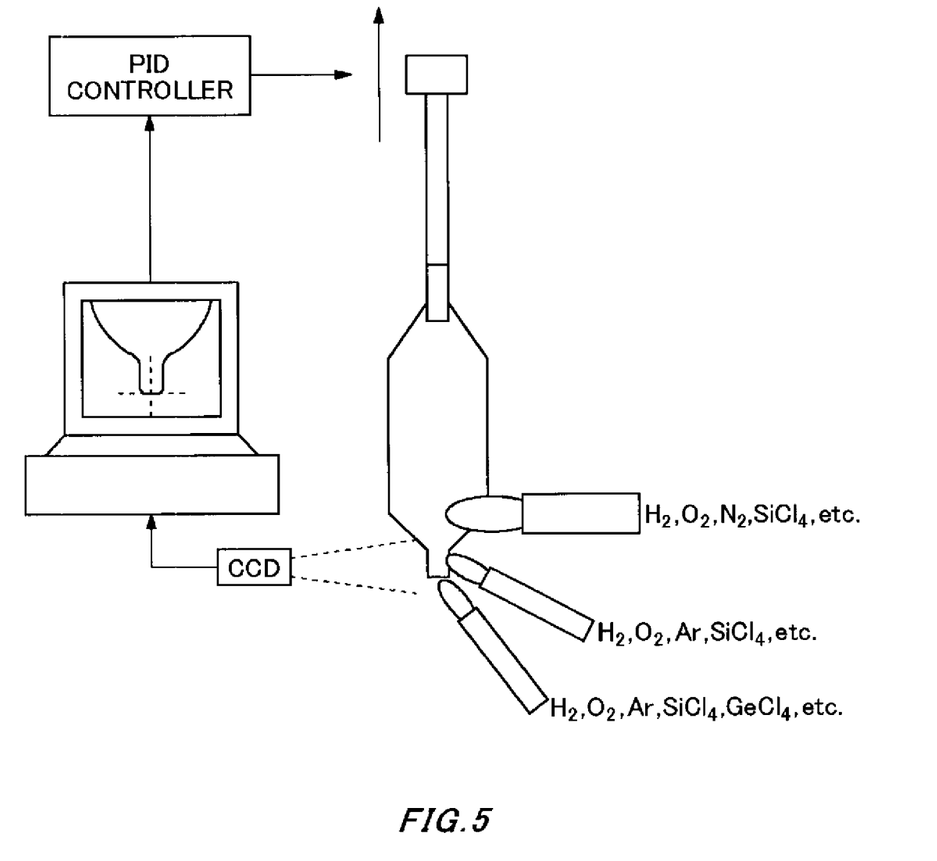
FIG. 5 is a schematic view showing the method for manufacturing an optical fiber base material using the VAD technique.

FIG. 5 is a schematic view of the VAD apparatus as an embodiment of the present invention. The VAD apparatus includes a core deposition burner, and a clad deposition burner positioned thereabove. These burners were each supplied with hydrogen, oxygen, non-volatile gas, and vaporized $SiCl_4$ as the raw material, all of which have a flow rate controlled by an MFC.

The supply of hydrogen to the VAD apparatus was set to normal hydrogen by closing the valve in the liquid hydrogen supply line.

The $SiCl_4$ supplied to the oxyhydrogen flame changed to $SiO_2$ due to the hydrolysis reaction, and the $SiO_2$ was sequentially deposited on the tip of a target being lifted and rotated to form a soot deposition body. During deposition, the tip of the soot deposition body was observed by a camera (CCD), and a PID controller adjusted the lifting speed according to the length of the soot deposit body to prevent the tip position from rising or falling.

Figure 6:
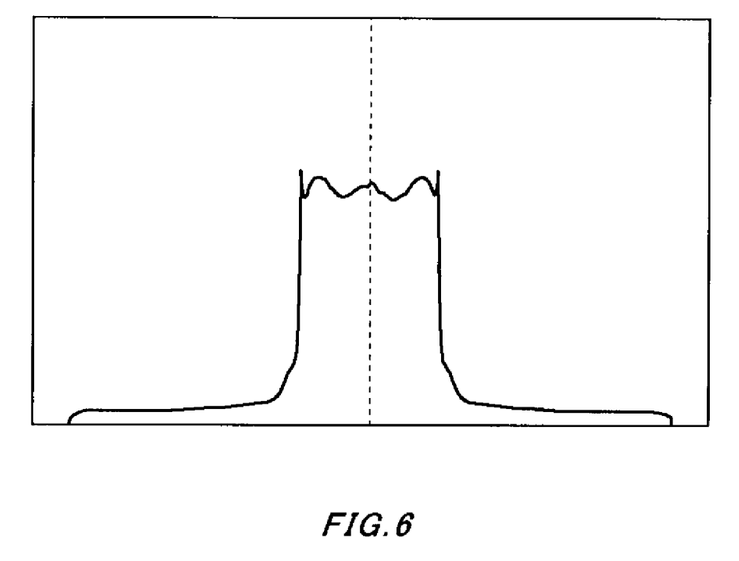
FIG. 6 is a schematic view showing the refractive index distribution of an optical base material manufactured using the VAD technique. The vertical axis represents the relative refractive index difference, and the horizontal axis represents a radial position on the preform.

In addition to $SiCl_4$, the bottom core deposition burner was supplied with $GeCl_4$. The $GeCl_4$ changed to $GeO_2$ due to the flame hydrolysis, and this $GeO_2$ was added to the resulting manufactured quartz glass to increase the refractive index. By supplying the $GeCl_4$ only to the core deposition burner, only the refractive index of the core portion increases. This results in an optical fiber preform having a refractive index distribution that is useful for optical fiber, as shown in FIG. 6. In FIG. 6, the vertical axis represents the relative refractive index difference, and the horizontal axis represents a radial position on the preform.

When a certain amount of the deposition has been completed, the supply of hydrogen to the core deposition burner and the clad deposition burner was switched from the normal hydrogen to the hydrogen obtained by vaporizing liquid hydrogen and, at the same time, the control value of the MFC of each piece of manufacturing equipment was increased by 1% from the value obtained as a product of the hydrogen flow rate immediately after switching and the correction coefficient.

Figure 7A:
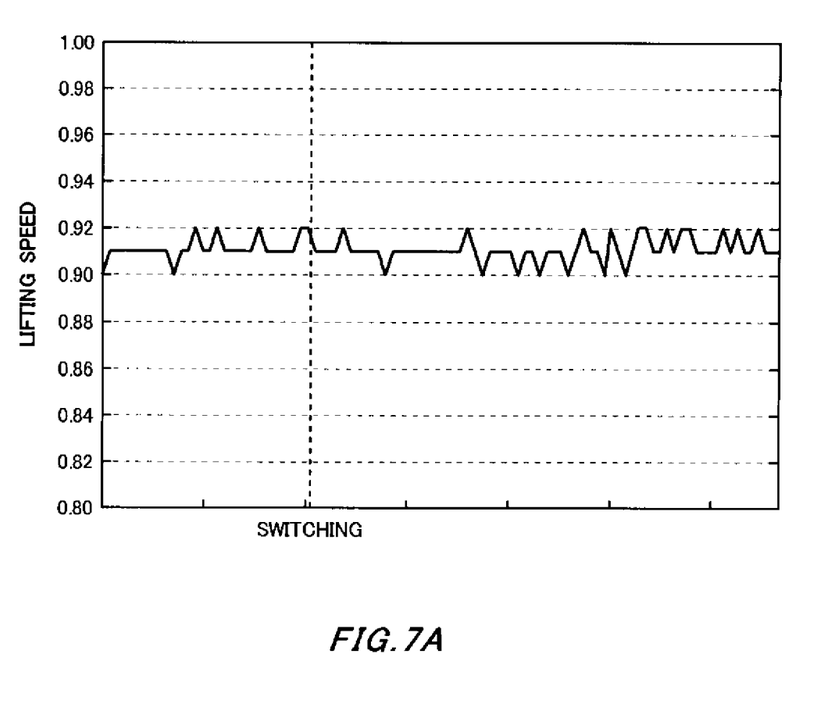
FIG. 7A shows a change in the lifting speed when the hydrogen supplied to the optical fiber base material manufacturing apparatus using the VAD technique, according to an embodiment of the present invention, is switched from normal hydrogen to hydrogen obtained by vaporizing liquid hydrogen. The vertical axis represents the lifting speed (mm/min) of the soot deposit body, and the horizontal axis represents time from left to right, where each partition is approximately 2.4 seconds.
Figure 7B:
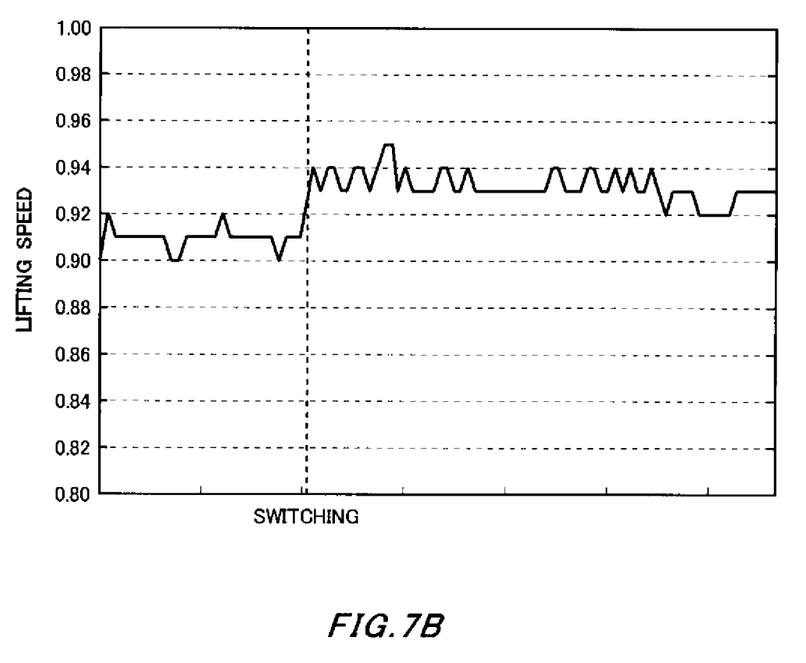
FIG. 7B shows a change in the lifting speed of a comparative example.
Figure 8:
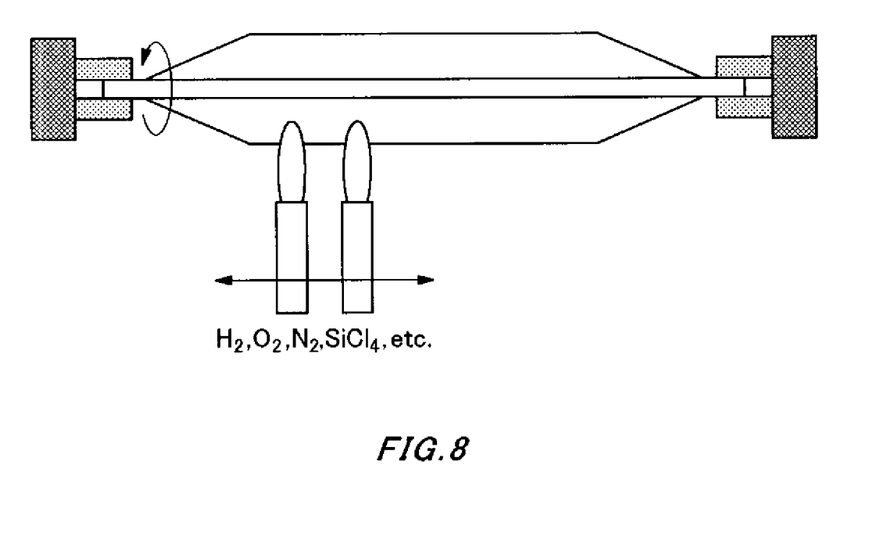
FIG. 8 is a schematic view showing a method for manufacturing an optical fiber base material using the OVD technique.

As a result, the actual flow rate of hydrogen is the same before and after the switching and, as shown in FIG. 7A, no abnormalities are seen in the lifting speed before and after the switching. Therefore, the optical fiber preform formed by changing the resulting soot deposit body into transparent glass has stable optical characteristics in a longitudinal direction. In FIGS. 7A and 7B, the vertical axes represent the lifting speed (mm/min) of the soot deposit body, and the horizontal axes represent time from left to right, where each partition is approximately 2.4 seconds.

In the OVD apparatus as well, when switching from the normal hydrogen to the hydrogen obtained by vaporizing liquid hydrogen, the control value of the MFC provided to each piece of manufacturing equipment is increased by 1%, in the same manner. As a result, no difference was seen in the density of the resulting porous base material when the normal hydrogen was used and when the hydrogen obtained from vaporizing liquid hydrogen was used.

Comparative Example 1

An optical fiber preform was manufactured in the same way as in the First Embodiment, except that, when switching from the normal hydrogen to the hydrogen obtained by vaporizing liquid hydrogen, the hydrogen flow rate was not corrected.

As a result, the actual flow rate of the hydrogen differed before and after the switching and the lifting speed increased by 2%, as shown in FIG. 7B. The optical fiber preform formed by changing the resulting soot deposit body into transparent glass was unusable because, due to the above difference, there was a change in the refractive index distribution, core diameter, and clad diameter. Furthermore, in a portion of the apparatus, the soot deposition body cracked. This cracking is believed to have occurred due to the actual flow rate of the hydrogen changing rapidly at the time of the switching, which caused the density to change quickly.

The switching was also performed for each OVD apparatus without adjusting the control value of the MFCs. As a result, the density of the manufactured porous base material decreased by about 1.5%. Therefore, the outer diameter increased to a point where the base material was too large to be inserted into a heating furnace for further processing, and so could not be turned into transparent glass.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, by using the embodiments of the present invention, an actual flow rate of hydrogen can be held constant, even when a supply of hydrogen is switched to backup hydrogen obtained by vaporizing liquid hydrogen, by multiplying the hydrogen flow rate immediately after the switching by a predetermined correction coefficient. As a result, the optical characteristics of a quartz glass optical fiber preform made using VAD can be stabilized. Furthermore, defects caused by a change in density during manufacturing of quartz glass using OVD can be prevented. Therefore, the embodiments of the present invention can be used to achieve optical fiber base material with stable optical characteristics and high yield, thereby enabling higher productivity.

What is claimed is:

1. A quartz glass manufacturing method comprising:
supplying hydrogen that is stored or made at a normal temperature to one or more burners, the one or more burners further being supplied with oxygen to generate an oxyhydrogen flame for use in generating silicon dioxide from silicide in a flame hydrolysis reaction;
controlling a hydrogen flow rate using a mass flow controller that performs measurement based on heat capacity of a gas and controls the hydrogen flow rate to be a set value;
vaporizing liquid hydrogen stored in a low-temperature storage chamber, and supplying the vaporized liquid hydrogen to the one or more burners as backup hydrogen;
switching from the hydrogen to the backup hydrogen; and
when switching, adjusting the set value to a value obtained by multiplying the hydrogen flow rate immediately after switching by a predetermined correction coefficient that increases the hydrogen flow rate by approximately 1%.

2. The quartz glass manufacturing method according to claim 1, wherein the silicide is silicon tetrachloride.

3. The quartz glass manufacturing method according to claim 1, wherein
a germanium compound is added to the silicide supplied to the flame of at least one burner from among the one or more burners.

4. The quartz glass manufacturing method according to claim 3, wherein
the germanium compound is germanium tetrachloride.

5. The quartz glass manufacturing method according to claim 1, wherein
the porous base material is formed by sequentially depositing on a tip of a starting material being lifted and rotated according to a VAD technique.

6. The quartz glass manufacturing method according to claim 1, wherein
the porous base material is formed by depositing around a starting material being rotated according to an OVD technique.

7. The quartz glass manufacturing method according to claim 1, wherein
the correction coefficient is determined based on the specific heat of orthohydrogen and the specific heat of parahydrogen.

* * * * *